United States Patent Office 2,789,048
Patented Apr. 16, 1957

2,789,048

WELDING STEEL FOR JOINING HIGH STRENGTH STEELS

William T. De Long, West Manchester Township, York County, and Gustaf A. Ostrom, Paradise Township, York County, Pa., assignors to The McKay Company, Pittsburgh, Pa., a corporation of Pennsylvania No Drawing. Application November 3, 1954, Serial No. 466,663

4 Claims. (Cl. 75—126)

This invention relates to welding steel, i. e., steel which can be weld-deposited, which has important improved characteristics. Our improved welding steel is especially adapted for welding together high strength steels.

In the past ten to fifteen years three austenitic type chromium-nickel welding steels have been widely used in the United States for the joining or welding together of high strength steels. Typical analyses and physical properties of those welding steels are given in the first three columns of Table I.

TABLE I
*Prior welding steels for joining high strength steels*

| No. | 1 | 2 | 3 | 4 | 5 | 6 |
|---|---|---|---|---|---|---|
| C (percent) | .09 | .09 | .13 | .12 | .10 | .12 |
| Cr (percent) | 19.0 | 19.0 | 25.5 | 19.5 | 17.5 | 12.5 |
| Mn (percent) | 4.0 | 2.0 | 2.0 | 8.0 | 10.0 | 19.5 |
| Ni (percent) | 9.5 | 9.5 | 20.5 | 9.0 | 2.0 | 1.5 |
| Mo (percent) | .7 | 2.0 | .1 | | | |
| Tensile (lbs./sq. in.) | 90,000 | 100,000 | 85,000 | 85,000 | 85,000 | 100,000 |
| Yield (lbs./sq. in.) | 66,000 | 73,000 | 59,000 | 45,000 | 57,000 | 57,000 |
| Elongation (percent) | 43 | 38 | 41 | 45 | 12 | 40 |
| Bead Crack Top (percent) | C | C | 70 | | | |
| Bead Crack Bottom (percent) | 5 | 5 | 85 | | | |

The values shown in Table I, and also in Table II, for the standard bead crack test represent the percent. of root bead cracked in a restrained butt joint in heavy plate under standard conditions. The letter "C" denotes cracking in the crater only in both Table I and Table II.

The welding steels of the first three columns of Table I have been successful for several reasons. In the first place, they have "weldability," that is, the ability to be deposited in substantially completely restrained or so-called "locked up" joints without excessive cracking in the bead. In this respect the newer modified type 308 welding steels are superior to the older type 310 welding steels as is shown by their performance in the standard crack test.

The standard bead crack test is defined in Military Spec. E-13080 (Ord.) and is a very severe test. The permitted 20% cracking is a measure set to equal the most severe conditions ever encountered in welding. For most normal fabrication situations involving alloy steels a level of performance in this test of 40 to 50% is satisfactory. The crack test applies only to the problem of getting sound metal into a joint and measures no other desirable property.

In the welding steels represented in the first two columns of Table I the bead cracking tendency in the weld crack test has been minimized by balancing the ferrite formers Cr and Mo against the austenite formers C, Mn and Ni to get some ferrite (usually 3–15%) in an austenitic matrix. If the deposit is fully austenitic it is less resistant to cracking. Type 310 (third column, Table I) is fully austenitic and illustrates that characteristic. It does not have as wide utility as the modified type 308 welding steels and requires careful control of welding conditions and skilled welders. The modified type 308 welding steels with controlled cracking have been used in production welding by welders who have had only basic instruction and who have never welded anything else.

A second reason for the selection of the welding steels above mentioned is their austenitic character which gives them a high solubility for hydrogen and enables them to be deposited by the fast electric shielded arc method without releasing quantities of hydrogen to an underlying hard ferritic base plate and so tending to crack it in its heat-affected zone. Entirely ferritic type welding steels have been developed for this type of welding and when they are used special precautions must be taken to keep moisture or other sources of hydrogen in the welding atmosphere below definite limits.

A third reason for the use of the welding steels above mentioned is the high level of their physical properties. They show good yield, tensile and elongation and experience has shown that they have good shock resistant properties and absorb great amounts of energy when ruptured.

While the welding steels above mentioned have been relatively satisfactory they are normally lower in strength than the metal to which they are applied and they contain a large percentage of nickel which is in short supply during periods of emergency.

Outside the United States similar solutions to the problem of welding high strength steels have been reached. Merritt (German Welding Rod Manufactur—"Iron Age," June 6, 1946) reports the most successful German alloy welding rod used for welding high strength plates during the war to have been Thermanit X whose composition and physical properties are listed in the fourth column of Table I. Other analysis used previously to this were Thermanit M and Thermanit P, whose properties are given in the fifth and sixth columns, respectively, of Table I. Thermanit X is very close relative of type 308 manganese welding steel. The two steels differ by 4% manganese which in the high nickel background is not critical.

We have discovered welding steels which are appreciably stronger and more satisfactory than any others which have been proposed for the joining of high strength steel plates, especially of the heat treated types. When properly balanced our new welding steels show unusually high strength coupled with adequate elongation and weld crack resistance. This favorable combination of physical properties is illustrated by two typical analyses shown in the first two columns of Table II.

TABLE II

*Improved welding steels for joining high strength steels*

| No | 7 | 8 | 9 | 10 | 11 | 12 | 13 | 14 |
|---|---|---|---|---|---|---|---|---|
| C (percent) | .30 | .35 | .14 | .30 | .40 | .40 | .40 | .40 |
| Cr (percent) | 16.0 | 12.5 | 16 | 16 | 16 | 16 | 16 | 16 |
| Mn (percent) | 16.0 | 12.5 | 16 | 16 | 16 | 16 | 16 | 16 |
| Ni (percent) | 1 | 1 | 1 | 1 | 1 | 1 | 1 | 1 |
| N (percent) | .15 | .05 | .15 | .15 | .15 | .15 | .15 | .15 |
| Mo (percent) | | | | | | | | 2 |
| V (percent) | | | | | | .8 | | .8 |
| Tensile (lbs./sq. in.) | 127,000 | 129,000 | 119,000 | 130,000 | 123,000 | 144,000 | 134,000 | 144,000 |
| Yield (lbs./sq. in.) | 95,000 | 83,000 | 91,000 | 97,000 | 95,000 | 117,000 | 98,000 | 121,000 |
| Elongation (percent) | 39 | 36 | 29 | 38 | 18 | 24 | 30 | 21 |
| Bead crack Top (percent) | C | C | C | C | 95 | 25 | 10 | 0 |
| Bead crack Bottom (percent) | 15 | 8 | 15 | C | 95 | 30 | 10 | 0 |

The features which make our new welding steels so desirable are:

(1) The deposits are austenitic or largely so. This is desirable for reasons previously mentioned.

(2) For austenitic type materials our new welding steels possess novel properties in that they have both high strength and crack resistance at the same time. This means that they can be successfully deposited in locked up joints between high strength plates with minimum cracking, which is their first requirement. After being successfully deposited they show very high strength and ductility in rupture which is also a very important property. Their high yield and tensile strength come closer to matching the properties of the high strength plate than other austenitic type welding steels have been able to do.

The components of our new welding steels are all familiar the enhanced physical properties are due to an unprecedented alloy balance which we have discovered. The three typical members of the chromium-nickel series appearing in the first three columns of Table I all have carbon at .13% or under. This is a favorable level for type 310 for which an upper limit of .20% is usually specified. As tests during World War II established, the modified type 308 compositions are most satisfactory with carbon held at .10% maximum, and while the usual specification permits up to .17% the crack sensitivity increases rapidly with increase in carbon and such higher carbon deposits are unsatisfactory because the welds will not usually survive the specified crack set.

Higher carbon levels would produce stronger alloys in the chromium-nickel series but cannot be resorted to because the weld bead crack resistance in a restrained or locked up joint would be too low. The German Thermanit X welding steel whose carbon is kept low behaves similarly.

Our new welding steels are chromium-manganese steels high in carbon; they have great strength without sensitivity to cracking. They exceed in strength those chromium-nickel welding steels which have enough crack resistance to be usable.

The effect of carbon on the strength, ductility and crack resistance of chromium-manganese welding steels may be illustrated by the alloy 16% Cr—16% Mn—1% Ni. Variations on this base are shown in columns 9 to 14, inclusive, of Table II. At the .14% carbon level the yield, tensile, elongation and crack resistance are good, but when the carbon is raised to .30% they are all improved and for the excellent crack resistance of these deposits the tensile strength is unprecedented.

When the carbon is raised to .40% the alloy gets somewhat out of balance but it can be restored to balance at that higher carbon level by the addition of carbide forming elements such as molybdenum and vanadium. The welding steel can thus be endowed with very high physical properties and crack resistance at the .40% carbon level. The carbon should not exceed about .50%.

Strong carbide formers such as Mo, V, W, Cb, Ti and Ta may be used to increase the strength of the alloy and the carbon should be increased as the carbide formers are added or increased.

The use of carbon as a strengthening agent in steel is not broadly new. However, the discovery of an alloy balance in the chromium-manganese area which has high physical properties coupled with weld crack resistance making it particularly suitable for the welding of restrained joints between high strength steel members is believed to be new.

The range of composition of our improved electrodes for welding high strength steel has been found to be as given in Table III.

TABLE III

| | Broad Range, percent | Preferred Range, percent |
|---|---|---|
| C | .15 to .50 | .15 to .45. |
| Cr | 11 to 20 | 13 to 19. |
| Mn | 10.5 to 19 | 12 to 18. |
| Ni | 0 to 4 | 0 to 2. |
| Mn+2Ni | 13 to 22 | 14 to 22. |
| N | 0 to .30 | .10 to .20. |
| Mo and/or W | 0 to 5 | 0 to 5. |
| V and/or Cb | 0 to 2 | 0 to 2. |
| (Mo and/or W)+2 (V and/or Cb) | 20 (C*—.50) to 20 (C—.10). | 20 (C—.20) to 20 (C—.20). |

*C stands for percent of carbon in the alloy. Only positive values of the parenthetical expressions in this line are significant; negative values are treated as zero.

Example analyses are given in Table IV.

TABLE IV

| | Percent | | |
|---|---|---|---|
| C | .30 | .35 | .40 |
| Cr | 16.0 | 12.5 | 16.0 |
| Mn | 16.0 | 12.5 | 16.0 |
| Ni | 1 | 1 | 1.0 |
| Mn+2Ni | 18.0 | 14.5 | 18.0 |
| N | .15 | .05 | .15 |
| Mo | | | 2.0 |
| V | | | .8 |

Nitrogen works with carbon in promoting austenitic structure and it is normally preferable to keep the nitrogen in the range .10–.20%.

With regard to other elements, the austenitizers copper and cobalt may be present in limited quantities. Silicon will normally be present in quantities up to 1.5 or even 2% since it is present in the commercial material available as core wire and is usually used as a deoxidizer in the coatings of coated welding electrodes.

While we have described certain present preferred embodiments of the invention it is to be distinctly understood that the invention is not limited thereto but may be otherwise variously embodied within the scope of the following claims.

We claim:

1. A weld deposit possessed of high strength and weld crack resistance especially suitable for welding together high strength steels having substantially the following composition:

| | Percent |
|---|---|
| C | .15 to .50 |
| Cr | 11 to 20 |
| Mn | 10.5 to 19 |
| Ni | 0 to 4 |
| Mn+2Ni | 13 to 22 |
| N | 0 to .30 |
| Mo and/or W | 0 to 5 |
| V and/or Cb | 0 to 2 |
| (Mo and/or W)+2(V and/or Cb) | 20(C—.50) to 20(C—.10) | in which, in the expressions C—.50 and C—.10, "C" stands for the percent of carbon in the welding steel and only positive values of such expressions are significant, negative values being treated as zero; the balance, except for impurities which do not substantially affect the properties of the steel, being iron.

2. A weld deposit possessed of high strength and weld crack resistance especially suitable for welding together high strength steels having substantially the following composition:

| | Percent |
|---|---|
| C | .15 to .45 |
| Cr | 13 to 19 |
| Mn | 12 to 18 |
| Ni | 0 to 2 |
| Mn+2Ni | 14 to 22 |
| N | .10 to .20 |
| Mo and/or W | 0 to 5 |
| V and/or Cb | 0 to 2 |
| (Mo and/or W)+2(V and/or Cb) | 20(C—.40) to 20(C—.20) | in which, in the expressions C—.40 and C—.20, "C" stands for the percent of carbon in the welding steel and only positive values of such expressions are significant, negative values being treated as zero; the balance, except for impurities which do not substantially affect the properties of the steel, being iron.

3. A structure comprising metal elements of high strength steel welded together, the weld being possessed of high strength and weld crack resistance and having substantially the following composition:

| | Percent |
|---|---|
| C | .15 to .45 |
| Cr | 13 to 19 |
| Mn | 12 to 18 |
| Ni | 0 to 2 |
| Mn+2Ni | 14 to 22 |
| N | .10 to .20 |
| Mo and/or W | 0 to 5 |
| V and/or Cb | 0 to 2 |
| (Mo and/or W)+2(V and/or Cb) | 20(C—.40) to 20(C—.20) | in which, in the expressions C—.40 and C—.20, "C" stands for the percent of carbon in the welding steel and only positive values of such expressions are significant, negative values being treated as zero; the balance, except for impurities which do not substantially affect the properties of the steel, being iron.

4. A structure comprising metal elements of high strength steel welded together, the weld being possessed of high strength and weld crack resistance and having substantially the following composition:

| | Percent |
|---|---|
| C | .15 to .50 |
| Cr | 11 to 20 |
| Mn | 10.5 to 19 |
| Ni | 0 to 4 |
| Mn+2Ni | 13 to 22 |
| N | 0 to .30 |
| Mo and/or W | 0 to 5 |
| V and/or Cb | 0 to 2 |
| (Mo and/or W)+2(V and/or Cb) | 20(C—.50) to 20(C—.10) | in which, in the expressions C—.50 and C—.10, "C" stands for the percent of carbon in the welding steel and only positive values of such expressions are significant, negative values being treated as zero; the balance, except for impurities which do not substantially affect the properties of the steel, being iron.

References Cited in the file of this patent

UNITED STATES PATENTS

| 2,686,116 | Schempp | Aug. 10, 1954 |
| 2,698,785 | Jennings | Jan. 4, 1955 |

FOREIGN PATENTS

| 354,976 | Italy | Dec. 15, 1937 |